United States Patent [19]

Jager

[11] Patent Number: 5,423,048

[45] Date of Patent: Jun. 6, 1995

[54] BRANCH TARGET TAGGING

[75] Inventor: Walter J. Jager, Kanata, Canada

[73] Assignee: Northern Telecom Limited, Montreal, Canada

[21] Appl. No.: 935,941

[22] Filed: Aug. 27, 1992

[51] Int. Cl.⁶ .............................................. G06F 13/00
[52] U.S. Cl. .................................... 395/775; 395/250; 395/425
[58] Field of Search .............. 395/375, 775, 725, 250, 395/425; 364/164, 938, 938, 948, 200

[56] References Cited

U.S. PATENT DOCUMENTS

| | | | |
|---|---|---|---|
| 4,742,451 | 5/1988 | Bruckert | 395/375 |
| 4,881,170 | 11/1989 | Morisada | 364/200 |
| 4,894,772 | 1/1990 | Langendorf | 364/200 |
| 4,943,908 | 7/1990 | Emma | 364/200 |
| 4,974,154 | 11/1990 | Matsuo | 364/200 |
| 5,127,091 | 6/1992 | Boufarah | 395/375 |
| 5,226,138 | 7/1993 | Shermis | 395/375 |

OTHER PUBLICATIONS

"RISC Enters a New Generation", BYTE Magazine, Aug. 1992, pp. 141–148.

Primary Examiner—Jack B. Harvey
Assistant Examiner—John Travis
Attorney, Agent, or Firm—F. P. Turpin

[57] ABSTRACT

A method and circuit for prefetching is provided wherein selective caching of instructions occurs. An instruction execution tree comprising a plurality of instructions is traversed in a predetermined manner. Instructions depending from both paths of a conditional branch instruction are prefetched. When it is determined that a branch of prefetched instructions is not in the path of execution the instructions associated with that branch are deleted thereby pruning the branch. Instruction addresses are therefore selectively removed from a storage memory in such a manner as to provide the cache with instructions which will likely be required by the processor.

10 Claims, 3 Drawing Sheets

BRANCH TARGET TAGGING

FIELD OF THE INVENTION

The invention relates generally to memory systems and more particularly to a computer system which utilizes a cache memory.

BACKGROUND OF THE INVENTION

Most computer systems include a processor and a memory system. The speed at which the processor can decode and execute instructions to process data has for some time exceeded the speed at which instructions and operands can be transferred from the main memory of the memory system to the processor. In an attempt to reduce the problems caused by a mismatch in speed, many computer systems also include a cache memory between the processor and the main memory.

A cache memory is a small, high-speed buffer memory which is used to temporarily hold a copy of those portions of the contents of main memory which are likely to be used in the near future by the processor. Typically, when the processor requires an instruction, the instruction is fetched from the cache memory or from the main memory via an instruction bus. The main purpose of a cache memory is to shorten the time necessary to provide the processor with required data or instructions. The information located in cache memory may be accessed in much less time than that located in main memory. Thus, a processor with a cache memory needs to spend far less time waiting for instruction and operands to be fetched and/or stored. For example, in typical large, high-speed computers, main memory can be accessed in 300 to 600 nanoseconds and cache memory in 20 to 40 nanoseconds.

The desired objective of a cache memory scheme is to maximize the probability of finding a main memory reference's information in the cache, to minimize the time required to access information that is needed by the processor (access time), and to minimize the delay due to a cache miss.

All of these objectives must be accomplished under cost constraints and in view of the interrelationship between the parameters, for example, the trade-off between hit ratio and access time.

The probability of finding the needed information in the cache memory is proportional to its size which of course depends on numerous factors such as cost, physical size, and access time.

More recently, cache memories have been coupled with instruction prefetch circuits for providing the storage of future processor instruction requests in the cache before the processor actually invokes the request. When instructions are prefetched from a main memory and written to a cache memory, those prefetched instructions may overwrite previously written instructions stored within the cache. This overwriting of previously written instructions with prefetched instructions is in effect replacing an historical portion of the cache with a predictive portion. In a predictive caching scheme where instructions are prefetched before they are requested by a processor, they are generally prefetched in sequential order. When an unconditional branch instruction is encountered, a prefetch unit usually follows the branch path and sequential instructions following the branch instruction are subsequently prefetched. When a conditional branch instruction is encountered, the prefetch unit having no information about the outcome of the branch condition will generally be programmed to prefetch instructions following the conditional branch instruction along the straight-through path, therefore not prefetching along the branch path. This, of course, is entirely a matter of design choice. It might be preferable in some instances to prefetch instructions along the branch path as the default on a conditional branch instruction.

In some instruction prefetching schemes, where the default condition is to take the straight-through path in the instance that a conditional branch instruction is encountered, the compiler orders the instructions in favour of the prefetch circuit's default condition which is the straight-through path; in essence, the instructions are ordered such that the likelihood of a conditional branch path being taken is less than 50 percent and the likelihood that the straight-through path is taken is greater than 50 percent.

Other schemes are known which attempt to predict the outcome of a conditional branch instruction before it is encountered so that the prefetch unit may make a decision regarding which path to take and therefore, which instructions to prefetch. Many of these schemes are less than ideal since decisions regarding which prefetch path to take are made based on the likelihood or probability of an expected result or outcome.

It is an object of the invention to provide an improved method of providing and maintaining a cache memory with instructions.

STATEMENT OF THE INVENTION

The invention provides a method and apparatus for storing interconnected branches of prefetched instructions and a method and means for pruning unwanted branches of stored instructions once it is determined that they are not required by a processor. This determination is made by the processor after processing relevant conditional branch instructions and determining which branch will be taken. All branches that will not be taken are pruned from the stored interconnected branches. Since the memory device in which the interconnected branches are stored is a fixed size, instructions which will not be required by the processor are pruned thereby providing space for other instructions.

In one aspect of the invention, in a computer system having a main memory containing instructions, some of which are conditional branch instructions, a conditional branch instruction having a first and a second sequence of instructions defining a first and second path respectively following said conditional branch instruction, and having a processor for processing instructions, a prefetcher for prefetching instructions before they are requested by the processor, a cache memory for storing prefetched instructions and a memory device for storing indicia relating to the location of instructions in the main memory which may have to be processed by the processor, there is provided a method of maintaining instructions in the cache memory comprising the steps of:

prefetching instructions and identifying any prefetched instructions that correspond to a conditional branch instruction;

if a prefetched instruction is a conditional branch instruction, continuing to prefetch instructions from one of either the first or second path following the conditional branch instruction and storing in the memory device, indicia relating to the location of the first instruction of the other of the first and second paths; storing in the memory device indicia corresponding to the location relating to the instruction last prefetched and prefetching instructions sequentially beginning with the address of the instruction stored in the memory device; and when it has been determined that instruction addresses stored in the memory device are no longer in the path of instructions to be executed, nullifying addresses from the memory device that are no longer in the path of execution.

In another aspect of the invention there is provided a method of maintaining instructions in a cache memory comprising the steps of:

prefetching instructions sequentially from a main memory;

if an instruction is a conditional branch instruction, storing the target address of the branch instruction in a memory;

if the last instruction prefetched is the last instruction in a block of instructions, storing the address of the start of a next sequential block of instructions in the memory, and prefetching a block of sequential instructions starting with the oldest address in the memory; and repeating the steps above while maintaining the memory for storing instructions, wherein the step of maintaining comprises deleting instructions from the memory after it has been determined that the instructions are not in the path of execution, wherein said deleting step represents pruning an unwanted branch.

In another aspect of the invention there is provided a circuit for providing instructions to a cache memory comprising:

means for prefetching instructions, coupled to a memory bus, said means responsive to the cache memory and requests from a processor, said means coupled to a memory bus for providing the memory bus with instruction addresses;

means responsive to the memory bus interface for determining if a prefetched instruction is a branch instruction;

first memory means responsive to the means for determining if a prefetched instruction is a branch instruction, for storing target addresses of branch instructions;

second memory means responsive to the first memory means and the means for prefetching instructions for storing the address and associated branch-tag bits of a current prefetched instruction; and third memory means for storing the address of an instruction that the processor is executing, said means coupled to the cache and to the first memory means.

BRIEF DESCRIPTION OF THE DRAWINGS

A best mode embodiment of the invention, by way of example, will be described in conjunction with the drawings in which.

DETAILED DESCRIPTION

When a computer program is written in either a high level or low level language, the instructions are generally compiled and a machine language program is generated. This machine language program is stored in a main memory and is in the form of sequenced instructions executable by a processor. Before the processor can execute an instruction, data relating to the processing of that instruction must be fetched from the main memory. Instructions are fetched and executed sequentially unless a branch instruction specifies an instruction which does not sequentially follow the last executed instruction; thus if a branch path is taken, the normal flow of sequential instructions is interrupted.

Figure 1:
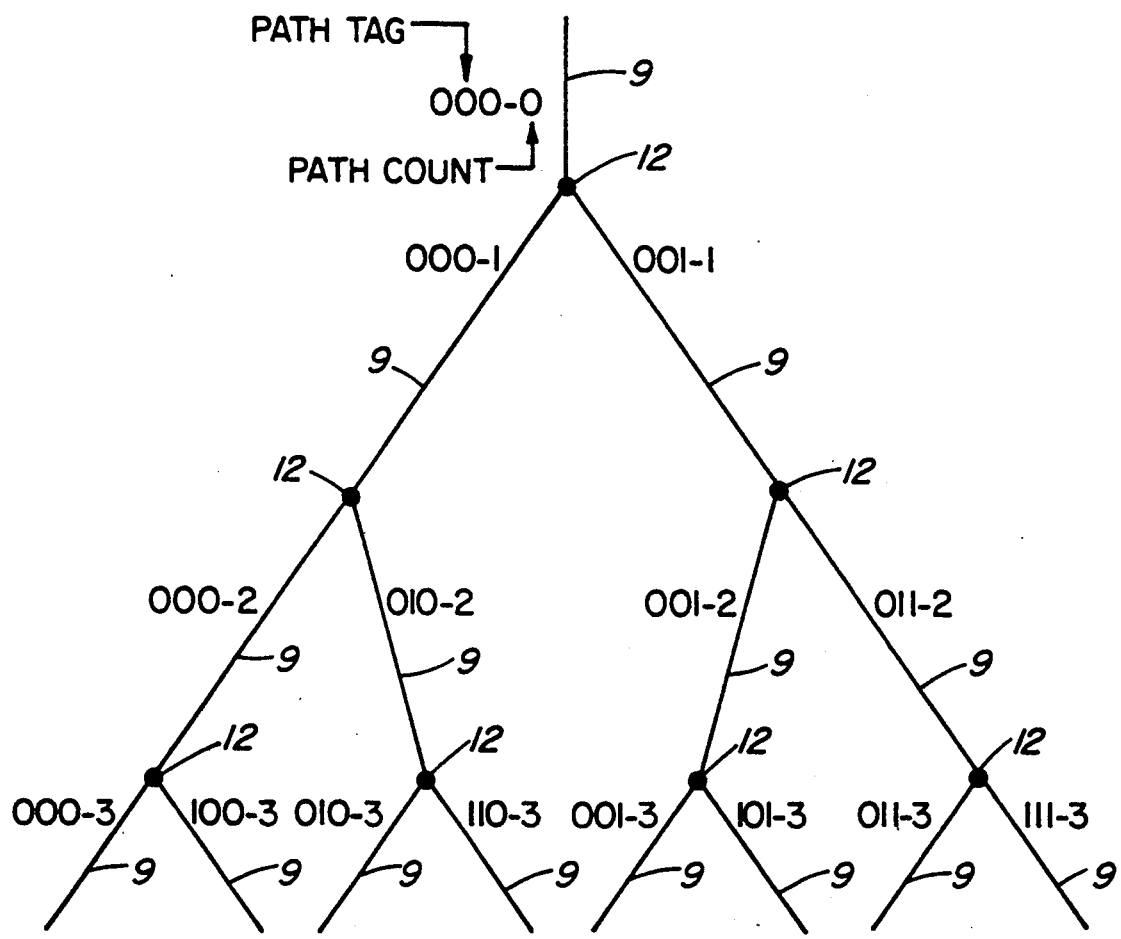
FIG. 1 is a diagram of an instruction execution tree.

In FIG. 1 a tree shows multiple instruction execution paths. The tree is made up of branches 9 which are interconnected at nodes 12. Each node represents a conditional branch instruction and each branch 9 represents a plurality of sequential instructions. Instructions referred to as sequential instructions are instructions which are stored at sequential locations in the main memory. Some branches 9 of instructions are longer than others and consequently some branches 9 include more instructions than others. A group of a predetermined number of instructions is referred to as a block of instructions. A branch 9 may contain a plurality of blocks of instructions or may contain less than a block of instructions. During the processing of instructions by the processor, a conditional branch instruction depicted by a node 12 may result in the condition of the branch being satisfied. Thus the conditional branch path is taken and the rightmost branch 9 depending from that node 12 is followed. Otherwise, if the conditional branch path is not taken, the straight-through path is taken and the leftmost branch 9 is followed. The leftmost branches 9 connected by nodes 12 correspond to sequential sequences of instructions. Any right branch 9 depending from a node 12 indicates an instruction or block of instructions which have branched from the previous block of sequential instructions. In FIG. 1, adjacent each branch 9 indicia is a branch-tag having 3 digits followed by a hyphen and a single digit. The 3 digit field termed the path-tag contains a binary number from 000 to 111; the single digit field termed the path-count contains a decimal number from 0 to 3. The single digit field is represented as a decimal number for illustrative purposes. In the implementation, the numbers 0,1, 2 and 3 of the single digit field are stored as a 2-bit field as binary numbers. Associating each instruction with indicia in the form of a path-tag and path-count allows for instructions to be mapped to a particular location within the tree. In the example shown in FIG. 1, an instruction having a path-tag 000 and a path-count of 2 is 2 levels down from level 0 of the tree. However, at some instances in time, the top of the tree may not have a path-tag 000 and a path-count of 0. At any given instance, the top of the tree is where the processor is currently executing instructions. In operation, the system is dynamic and the top or head of the tree need not necessarily begin with 000-0 as shown. In the tree of FIG. 1, the path-tag 000 indicates that no branch instructions have been executed before the instant instruction in the tree as shown. For an instruction having a path-tag 001 and a path-count of 1, the path-count indicates that the instruction is 1 level down from the top of the tree. A path-tag 001 indicates that one branch has been taken from the straight-through path. This form of mapping by associating a path-tag and path-count with each instruction provides a mechanism for preventing some instructions from being written into a cache memory after it has been determined that they are not in the path of execution. For example, if a group of instructions which depend from a branch that is not taken by the processor has not been cached, that group of instructions can be disregarded or nullified leaving more space in the cache memory for instructions that may be required by the processor. The number of the bit positions in the path-tag and path-count fields is of course dependent on the desired depth of the prefetched portion of the execution tree. The greater the depth of the execution tree, the greater the number of bit positions required for the path-tag and path-count fields.

Figure 2:
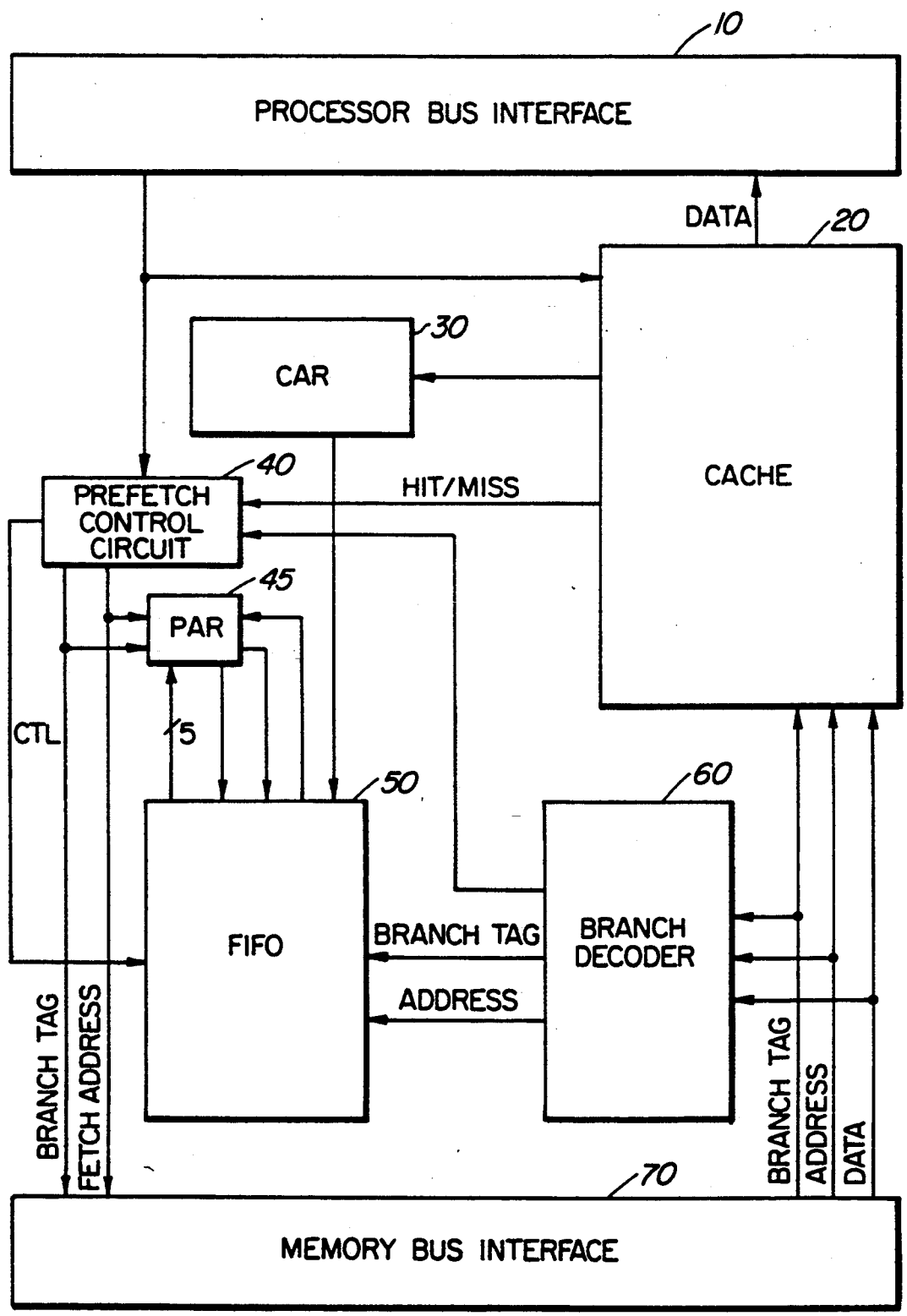
FIG. 2 is a block diagram of a memory system in accordance with the invention.

FIG. 2 illustrates circuitry in accordance with the invention. A processor bus interface circuit 10 is coupled to a cache memory 20 and a prefetch control circuit 40 in the conventional manner. When the processor (not shown) requests data in the form of an instruction, the instruction is provided to the processor from the cache memory 20 if it is found in the cache; this is termed a cache hit. A requested instruction not found in the cache is termed a cache miss and must be fetched from the main memory (not shown) via the memory bus interface 70. The prefetch control circuit 40 provides the dual functions of prefetching and storing instructions in the cache memory 20 before they are requested by the processor and fetching a requested instruction from the main memory if there is a cache miss. A current address register (CAR) 30 is coupled to the cache memory 20 and to a content addressable first-in first-out (FIFO) memory 50.

Figure 3:
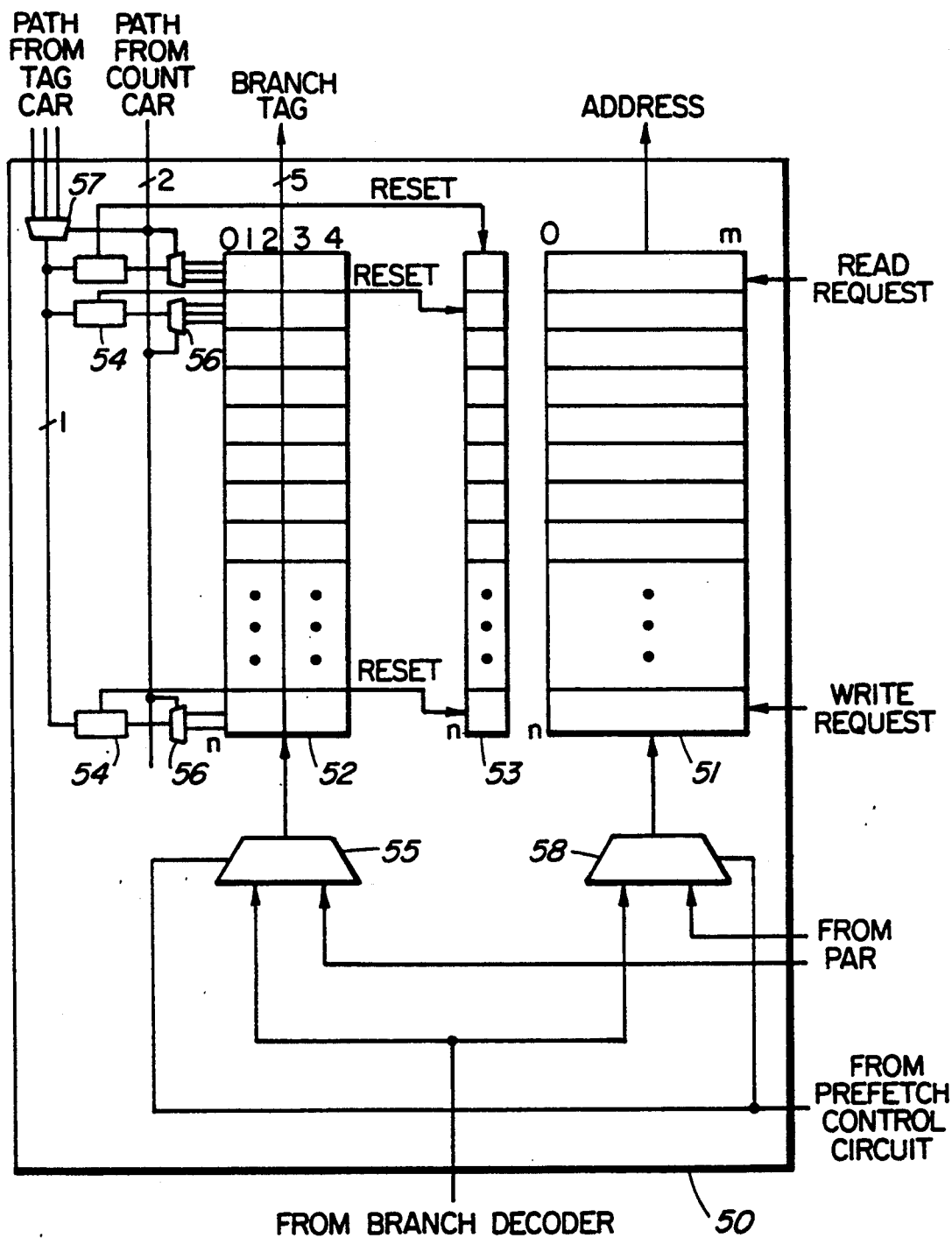
FIG. 3 is a more detailed diagram of the FIFO shown in the memory system of FIG. 2.

In FIG. 3 the content addressable FIFO 50 is shown to include three memory blocks 51, 52, and 53 all of which operate in a conventional first-in first-out manner in tandem. Memory block 51 is an m×n block of memory for storing addresses of instructions which may be executed at a later time. Memory block 53 is a 1×n memory which is used to indicate whether data stored is valid or invalid. Data may also be written to the memory 53 in an out of first-in first-out order by comparators 54 via their respective reset lines. Each of the comparators 54 compare a path-tag stored in the CAR 30 and received via a gated element 57 with path-tags stored in the memory block 52 each one gated out via a respective element 56. Externally generated control signals such as write and read request signals and multiplexer control signals for controlling the multiplexors 55 and 58 are generated by the prefetch control circuit 40.

In operation, the CAR 30 contains the address of the instruction that the processor is currently executing. The FIFO 50 functions as a "To Do" List and stores instruction addresses of future instructions that are currently expected to be executed by the processor. After the execution of a conditional branch instruction it is known if the branch path or the straight-through path will be taken. If a straight-through path will not be taken, all instruction addresses along that straight-through path and dependent from that node are removed from the FIFO 50 thereby pruning the tree of unwanted branches of instructions. On the other hand, if the result of an instruction executed by the processor indicates that a branch straight-through path will be taken, the branch target instruction addresses and instructions dependent from the branch target instruction are removed from the FIFO 50. The effect of pruning addresses in the FIFO 50 is that more locations are available in the cache memory 20 for instructions that will be executed by not prefetching instructions that are known not to be in the path of execution. Furthermore, time is not wasted prefetching instructions that will not be executed in the near future. Details of the actual pruning selection are very much a matter of design choice. For example, entries in the FIFO 50 that should be pruned can later be over-written or alternatively those unwanted entries can be deleted or ignored. By way of example, details of the pruning process are given below in step (C) of the maintenance steps. A prefetch address register (PAR) 45 is coupled to the prefetch control circuit 40 and to the FIFO 50 and stores the address and associated branch-tag of the current prefetched instruction. The tree shown in FIG. 1 is used by way of example to summarize and illustrate the operation of maintaining the cache memory 20 with instructions as described above. In effect, the tree shown in FIG. 1 is traversed by sequentially prefetching instructions stored in the main memory. If a conditional branch instruction is encountered during the prefetching of instructions, the branch target address is temporarily stored in the FIFO 50 in the "To Do" List and prefetching of sequential instructions continues along the left-most straight-through path. Alternatively, the prefetching could continue from the branch target address and the address of the instruction sequentially following the last prefetched instruction could be stored in the "To Do" List. At predetermined intervals, defined in the instant example embodiment as the end of prefetching a block of instructions, the address of the next sequential instruction and indicia relating to the location of that instruction in the tree is stored in the "To Do" List and prefetching continues from the least recently used valid address in the "To Do" List. This mechanism of storing the address at the end of a block or the target of a branch instruction allows instructions at each side of a node to be prefetched alternately, thus preventing the prefetching of instructions on a single branch path that may result in the caching of instructions that may not be required by the processor. The prefetching of both sides of a node or several nodes allows for a more balanced scheme. The addresses in the "To Do" List can be removed or deleted if it is known that the processor will not be executing an upper related branch. By way of example, the operation of the circuit shown in FIG. 2 can be understood by the following prefetch and maintenance methods:

Prefetch Method

If there is a cache miss, store the address not found in the cache in the PAR. (This "If" statement also takes care of the start-up scenario where the desired information will not be found in the cache.)

(A) Prefetch the instruction corresponding to the address stored in the PAR, the instruction associated with the current block being prefetched. (The prefetch control circuit 40 controls and performs this step.)

(B) If the instruction is a branch instruction:
  (i) Append the address of the destination to the "To Do" List (FIFO 50) with a branch-tag that is the same as the branch-tag of the branch instruction except that the path-coun(th) bit of the path-tag is complemented and the path-count incremented (thereby indicating a level down). (The branch decoder 60 determines if the instruction is a branch from the op-code.)
  (ii) Increment path-count in the PAR.

(c) Increment the address in the PAR. (The prefetch control circuit 40 performs this step.)

(D) If the current block has not been prefetched go to (A) continuing to prefetch instructions linearly. The prefetch control circuit 40 tests this condition.

(E) Append current address and branch-tag (path-tag and path-count) to the "To Do" List (FIFO 50). The prefetch control circuit 40 controls this step.

(F) Store the first address from the "To Do" List into the PAR and go to (A).

Maintenance Method (A) wait for the CPU to request an instruction;

(B) If the requested instruction is in the cache, fetch the instruction from the cache. If the instruction is not a branch instruction, go to (A);

(c) With the next instruction compare the path coun(th) bit of the path-tag in the CAR with everything in the "To Do" list and if different delete entries that are different. Update the PAR if necessary to prevent continued prefetching on a pruned branch; go to (A).

Or alternatively, (A') Wait for the CPU to request an instruction;

(B') If the requested instruction is in the cache, fetch the instruction from the cache; and (C') With the next instruction compare the path coun(th) bit of the path-tag in the CAR with everything in the "To Do" List and if different, delete those different entries; go to (A').

In the prefetching method above, at predetermined instances delineated by steps (B) and (E), the continued prefetching of sequential instructions is interrupted and the FIFO 50 is updated.

Below is a table representing a list of ordered instructions. The contents of the CAR 30, the PAR 45 and the cache 20 are shown as each instruction is executed. The contents of the FIFO 50 or "To Do" List are also shown for the sequence of ordered instructions.

| PREFETCHING | |
|---|---|
| Instruction | CAR |
| #1 - ALU Instruction | #1  000-0 |

| Cache | | |
|---|---|---|
| #1 - | ALU instruction | 000-0 |
| #2 - | ALU instruction | 000-0 |
| #3 - | ALU instruction | 000-0 |
| #4 - | bcc #20 | 000-0 |
| #5 - | ALU instruction | 000-1 |
| #6 - | ALU instruction | 000-1 |
| #7 - | bcc #30 | 000-1 |
| #8 - | ALU instruction | 000-2 |
| At this time, | | |
| PAR: | #9 | 000-2 |

During the prefetching, the address and branch-tag of the target of each conditional branch is added to the "To Do" List. After a prefetch block has been prefetched, the address and branch-tag of the next sequential instruction stored in the PAR is appended to the end of the "To Do" List.

| "To Do" List: | |
|---|---|
| #20 - | 001-1 |
| #30 - | 010-1 |

| "To Do" List: | |
|---|---|
| #9 - | 000-2 |

The top entry of the "To Do" List is removed and put into the PAR.

| PAR: | #20  001-1 |
|---|---|

A prefetch block is prefetched from the new entry in the PAR.

| Cache | | |
|---|---|---|
| #1 - | ALU instruction | 000-0 |
| #2 - | ALU instruction | 000-0 |
| #3 - | ALU instruction | 000-0 |
| #4 - | bbc #20 | 000-0 |
| #5 - | ALU instruction | 000-1 |
| #6 - | ALU instruction | 000.1 |
| #7 - | bcc #30 | 000-1 |
| #8 - | ALU instruction | 000-2 |
| #20 - | ALU instruction | 001-1 |
| #21 - | ALU instruction | 001-1 |
| #22 - | bcc #40 | 001-1 |
| #23 - | ALU instruction | 001-2 |
| #24 - | ALU instruction | 001-2 |
| #25 - | ALU instruction | 001-2 |
| #26 - | ALU instruction | 001-2 |
| #27 - | ALU instruction | 001-2 |
| At this time, | | |
| PAR: | #28 | 001-2 |

The target of the conditional branch instruction at address #22 is appended to the "To Do" List. The address and branch-tag of the next sequential instruction (PAR) is appended to the end of the "To Do" List.

| "To Do" List: | |
|---|---|
| #30 - | 010-1 |
| #9 - | 000-2 |
| #40 - | 011-2 |
| #28 - | 001-2 |

Prefetching continues by transferring the top entry in the "To Do" List into the PAR.

MAINTENANCE

During this time the CPU continues fetching instructions:

| Instructions: | CAR |
|---|---|
| #1 - ALU instruction | #1  000-0 |
| #2 - ALU instruction | #2  000-0 |
| #3 - ALU instruction | #3  000-0 |
| #4 - bcc #20 | #4  000-0 |
| #5 - ALU instruction | #5  000-1 |

The CPU did not take the conditional branch path in instruction #4. All entries in the "To Do" List that have a path-tag of xx1 (the zero(th)) bit of the path-tag is different from that in Instruction #5 (the chosen path) are nullified by way of being deleted or invalidated.

| "To Do" List: | |
|---|---|
| #30 - | 010-1 |

-continued

"To Do" List:

| #9 - | 000-2 | |
|---|---|---|
| #40 - | 011-2 | deleted |
| #28 - | 001-2 | deleted |

The block of instructions currently being prefetched has a branch path of xx1.

| PAR: | #28 | 001-2 |
|---|---|---|

Prefetching of this block is halted and the next entry from the top of the "To Do" List is transferred to the PAR.

| PAR | #30 | 010-1 |
|---|---|---|

"To Do" List:

| #9 - | 000-2 |
|---|---|

A block of instructions starting, at address #30 is prefetched.

Thee above instructions are listed in sequential order as they would be stored in memory. The first instruction is stored at address #1 followed by instructions stored at subsequent memory locations in conventional memory. As each instruction is executed the contents of the CAR 30 is changed to hold the address and branch-tag of the corresponding current instruction to be executed. The table shows the contents of the CAR. 30 corresponding to the execution of each instruction. The contents of the FIFO 50 are also shown containing the address and branch-tags of instructions to be prefetched in the future. As the Maintenance Method illustrates, address entries stored in the FIFO 50 are deleted once it has been established that a particular associated branch path will not be executed. Deleting entries from the "To Do" List or FIFO 50 prevents the prefetching of instructions that the processor will not likely be executing in the near future. It should be noted however, that in the embodiment shown in FIG. 3, an entry is not deleted in the conventional sense of deleting by erasure. Entries are deleted by tagging so that they will be ignored and later written over. Tagged entries are tagged invalid by setting a valid/invalid bit in memory block 53. A better understanding of the operation of the content addressable FIFO 50 shown in FIGS. 2 and 3 and may be obtained from the following detailed description. Each time the address of an instruction is to be added to the "To Do" List, the address and the associated branch-tag is stored in the nth location of memory blocks 51 and 52 respectively. All data stored in the nth location is shifted to the (n−1)th location when newer data is written into the nth location. This shifting of entries upward results in data being shifted from the nth to the 0th location. Any data read from the 0th location is ignored when the valid/invalid bit is set to an invalid state; otherwise, if the bit is set to a valid state, prefetching continues from the address which was read from the 0th location of memory block 51. Alternatively, instead of the 0th and the nth locations being fixed locations, they could be variable with head and tail pointers being used to keep track of entries temporally. Comparators 54 compare a selected path-tag bit stored in the CAR 30 with the same path-tag bit stored in each of the n locations of memory block 52. When two compared corresponding path-tag bits are unequal, the associated valid/invalid bit is set to the invalid state via the reset line from the corresponding comparator 54. Data in the memory block 51 which has an associated valid/invalid bit set to an invalid state is ignored and later written over with newer data. This has the effect of pruning a node 12 on the tree (shown in FIG. 1) and any depending branches. In this manner, the content addressable FIFO 50 performs the functions of both a first-in first-out memory and a content addressable memory.

It should further be realized that numerous other embodiments may be considered without departing from the scope of the invention.

What I claim is:

1. In a computer system having a main memory containing instructions, some of which are conditional branch instructions, a conditional branch instruction having a first and a second sequence of instructions defining a first and second path respectively following said conditional branch instruction, and having a processor for processing instructions, a prefetcher for prefetching instructions before they are requested by the processor, a cache memory for storing prefetched instructions and a memory device for storing indicia relating to the location of instructions in the main memory which may have to be processed by the processor, a method of maintaining instructions in the cache memory comprising the steps of:

prefetching instructions and identifying any prefetched instructions that correspond to a conditional branch instruction;

if a prefetched instruction is a conditional branch instruction, continuing to prefetch instructions from one of either the first or second path following the conditional branch instruction and storing in the memory device, indicia relating to the location of the first instruction of the other of the first and second paths;

storing in the memory device indicia corresponding to the location relating to the instruction last prefetched and prefetching instructions sequentially beginning with the address of the instruction stored in the memory device; and when it has been determined that instruction addresses stored in the memory device are no longer in the path of instructions to be executed, nullifying addresses from the memory device that are no longer in the path of execution.

2. A method as defined in claim 1 wherein the memory device is an addressable FIFO wherein data is normally stored and removed in a first-in first-out fashion and wherein the data stored therein may be nullified by either overwriting or deletion.

3. A method as defined in claim 2 wherein the step of profetching instructions sequentially from the FIFO begins with the oldest instruction in the FIFO.

4. A method as defined in claim 1 wherein the step of storing in the memory device indicia corresponding to the location relating to the instruction last prefetched occurs at predetermined instances corresponding to n sequential instructions being prefetched from a branch path, wherein n is a predetermined number.

5. A method as defined in claim 1 wherein the indicia relating to the location of the first instruction of the other of the first and second paths is in the form of a branch-tag comprising data bits which correspond to the location of the first instruction of the other of the first and second paths.

6. A method as defined in claim 5 wherein a branch-tag is a unique identifier for identifying a single branch path.

7. In a computer system having an instruction processor, a main memory, a cache memory and an addressable FIFO, a method of maintaining instructions in the cache memory comprising the steps of:
   (a) prefetching instructions to form a block of n sequential instructions from a main memory and storing them in the cache memory;
   (b) if a prefetched instruction is a conditional branch instruction, interrupting the prefetching of the block of sequential instructions, and storing in the addressable FIFO an address corresponding to the address of the next sequential instruction and an indicia corresponding to the location where said interrupted block was interrupted;
   (c) prefetching a next block of sequential instructions starting with the instruction at the branch target address and repeating step (b);
   (d) if prefetching of the current block has not been completed, continue prefetching by performing step (a);
   (e) if prefetching of the current block has been completed, storing in the addressable FIFO the destination address of the instruction at the start of the next sequential block; and
   prefetching instructions sequentially from a block of instructions starting at an address least recently stored in the FIFO;
   (f) at predetermined instances of program execution, eliminating addresses from the FIFO that are no longer in the path of execution and repeating step (b).

8. A method of maintaining instructions in a cache memory comprising the steps of:
   prefetching instructions sequentially from a main memory;
   if an instruction is a conditional branch instruction, storing the target address of the branch instruction in a memory;
   if the last instruction prefetched is the last instruction in a block of instructions, storing the address of the start of a next sequential block of sinstruction in the memory, and prefetching a block of sequential instructions starting with the oldest address in the memory; and
   repeating the steps above while maintaining the cache memory for storing instructions, wherein the latter comprises deleting instructions from the cache memory after it has been determined that the instructions are not in the path of execution, the deleting step representing the pruning of an unwanted branch.

9. A circuit for maintaining a cache memory with instructions comprising:
   means for prefetching instructions, coupled to a memory bus, said means responsive to the cache memory and requests from a processor, said means coupled to a memory bus for providing the memory bus with instruction addresses;
   means responsive to the memory bus interface for determining if a prefetched instruction is a branch instruction;
   first memory means responsive to the means for determining if a prefetched instruction is a branch instruction, for storing target addresses of branch instructions;
   second memory means responsive to the first memory means and the means for prefetching instructions for storing the address and associated branch-tag bits of a current prefetched instruction; and
   third memory means for storing the address of an instruction that the processor is executing, said means being coupled to the cache and to the first memory means.

10. A circuit as defined in claim 9 wherein the first memory means is an addressable FIFO.

* * * * *